US011783316B2

(12) United States Patent
Chen et al.

(10) Patent No.: US 11,783,316 B2
(45) Date of Patent: Oct. 10, 2023

(54) METHOD AND SYSTEM OF CAPTURING CONTACTLESS COMMUNICATION INTERACTIONS FOR DEBUGGING AND EVALUATING CONTACTLESS CARD TRANSACTION

(71) Applicant: Visa International Service Association, San Francisco, CA (US)

(72) Inventors: Yuexi Chen, Foster City, CA (US); Kiat Chun Tan, Singapore (SG); Arlene Yap Bernas, Singapore (SG); Si Xiang Lim, Singapore (SG)

(73) Assignee: Visa International Service Association, San Francisco, CA (US)

( * ) Notice: Subject to any disclaimer, the term of this patent is extended or adjusted under 35 U.S.C. 154(b) by 50 days.

(21) Appl. No.: 17/184,696

(22) Filed: Feb. 25, 2021

(65) Prior Publication Data
US 2022/0270073 A1   Aug. 25, 2022

(51) Int. Cl.
  *G06Q 20/32*   (2012.01)
  *G07F 7/08*   (2006.01)
  *G06Q 20/34*   (2012.01)

(52) U.S. Cl.
  CPC ....... *G06Q 20/3278* (2013.01); *G06Q 20/352* (2013.01); *G07F 7/0893* (2013.01)

(58) Field of Classification Search
  None
  See application file for complete search history.

(56) References Cited

U.S. PATENT DOCUMENTS

| 2013/0054474 A1* | 2/2013 | Yeager | G06Q 20/3278 |
| | | | 705/71 |
| 2013/0130614 A1 | 5/2013 | Busch-Sorensen | |

(Continued)

FOREIGN PATENT DOCUMENTS

| CA | 2733304 A1 | 9/2011 |
| KR | 101058993 B1 | 8/2011 |

(Continued)

OTHER PUBLICATIONS

Francis et al., "On the security issues of NFC enabled mobile phones", Int. J. Internet Technology and Secured Transactions, 2010, pp. 336-356, vol. 2, Nos. 3/4.

(Continued)

*Primary Examiner* — Namrata Boveja
*Assistant Examiner* — Amit Patel
(74) *Attorney, Agent, or Firm* — THE WEBB LAW FIRM

(57) ABSTRACT

A method and system for capturing contactless communication interactions for debugging and evaluating a contactless card. The method includes receiving Near Field Communication (NFC) signaling from a contactless card. Upon receiving the NFC signal, a contactless transaction is initiated between a card emulation device and a payment device. The method includes obtaining Application Protocol Data Unit (APDU) commands from the payment device in response to initiation of the contactless transaction. Further, the APDU commands are provided to the contactless card, and in response, an APDU response is received from the contactless card. Thereafter, the method includes transmitting the APDU response of the contactless card to the payment device. The APDU command and APDU response are stored in each of the reader device and the card emula- (Continued)

tion device for debugging and evaluating the contactless card transaction.

12 Claims, 7 Drawing Sheets

(56) References Cited

U.S. PATENT DOCUMENTS

| | | |
|---|---|---|
| 2014/0256251 A1 | 9/2014 | Caceres et al. |
| 2015/0180836 A1 | 6/2015 | Wong et al. |
| 2016/0086168 A1 | 3/2016 | McKelvey |
| 2017/0055101 A1 | 2/2017 | Studerus et al. |

FOREIGN PATENT DOCUMENTS

| | | |
|---|---|---|
| KR | 101178738 B1 | 8/2012 |
| WO | 2012170895 A1 | 12/2012 |
| WO | 2013040605 A2 | 3/2013 |

OTHER PUBLICATIONS

Smith, "Smart Card Standards: What Do They All Mean", Microcosm Ltd., May 14, 2019, 4 pages.

* cited by examiner

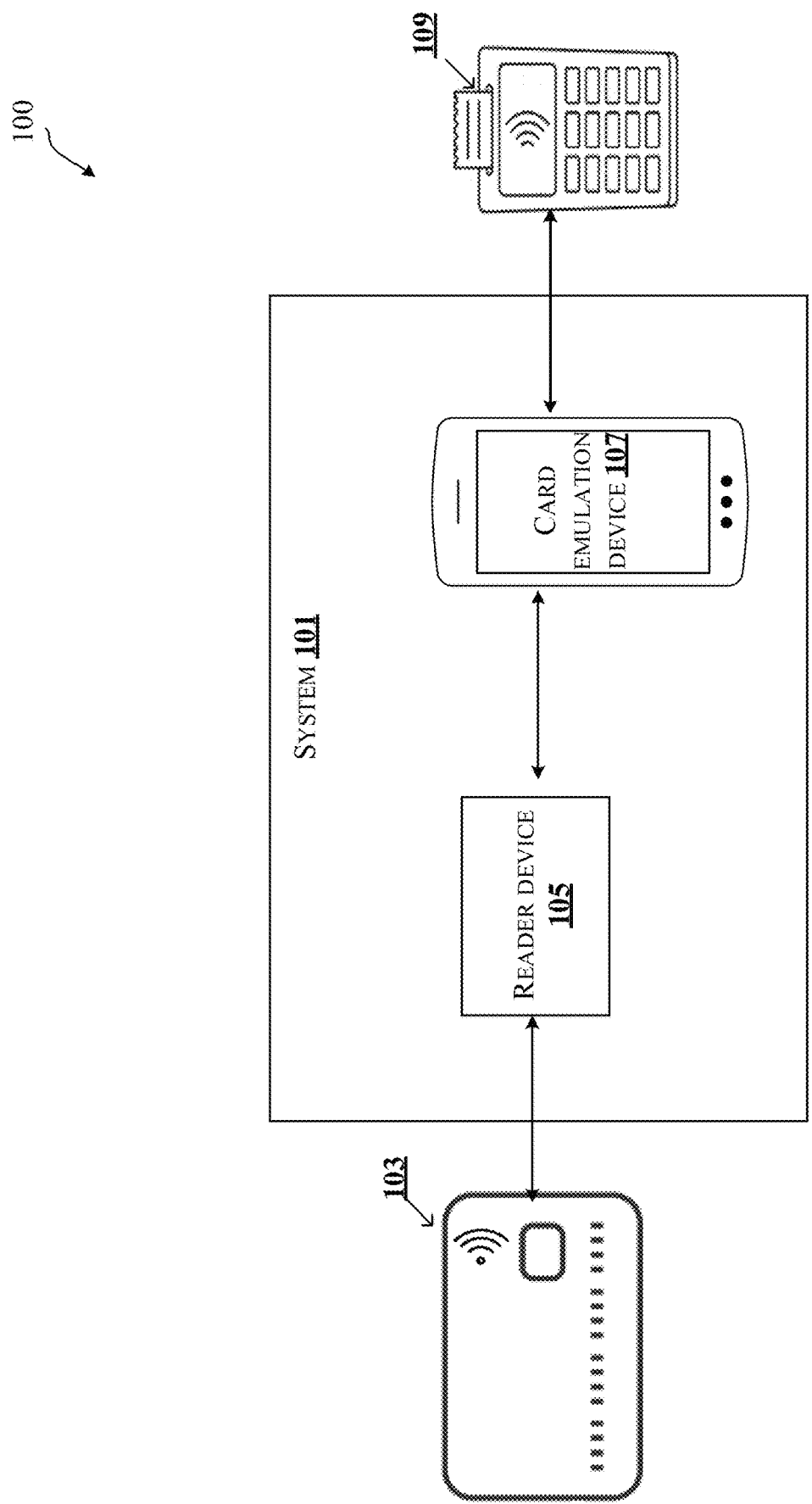

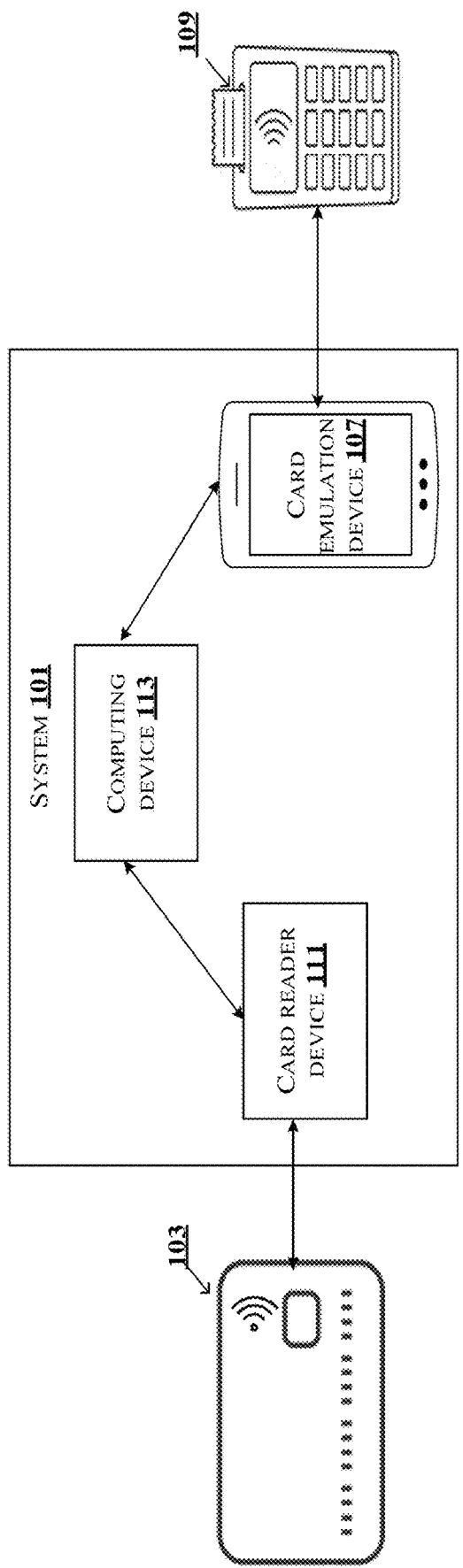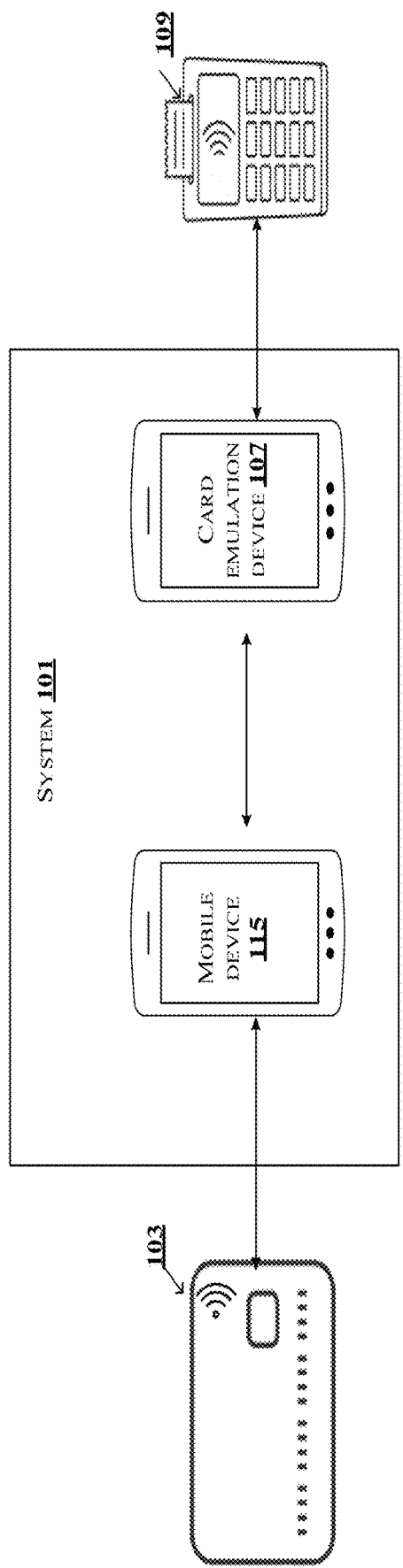

… … …

METHOD AND SYSTEM OF CAPTURING CONTACTLESS COMMUNICATION INTERACTIONS FOR DEBUGGING AND EVALUATING CONTACTLESS CARD TRANSACTION

BACKGROUND

1. Technical Field

The present disclosure relates to the field of contactless communication systems and testing, and more specifically, capturing contactless communication interactions for debugging and evaluating contactless cards.

2. Technical Considerations

Contactless payment is also referred to as tap-and-go or tap by some banks and retailers. Contactless payments refer to mobile phones, credit cards, and other devices that do not require a physical connection between a point-of-sale (POS) terminal and a payment device of consumers. Typically, the term contactless payment refers to a secure method for consumers to purchase products or services using a debit, credit, smartcard, or another payment device by using radio frequency identification (RFID) technology and Near Field Communication (NFC). This payment method works by tapping a payment card or other device near a POS terminal equipped with contactless payment technology.

With improvement in communication technology, contactless cards are observing a growing interest in the market as they enable fast and easy operations, given that the card has to be just waved in proximity of the reader, in several cases without even a need to pull it out of the wallet or pocket. In addition, their contactless communication nature eliminates common wear and tear effect that affects contact smart cards. Contactless cards are becoming more and more widespread and used, among others, as tokens for access control of protected facilities and environments, as electronic identity documents, as payment cards, and as electronic tickets.

Since payment transactions are performed contactless today, there is a need to acquire a technology that can easily capture data exchange within those contactless interactions. Mostly, these techniques are required to debug and isolate a field problem in existing contactless communication protocols. There are times when a card may get unexpected behaviors such as declines or unexpected offline/online approvals or unexpected errors in the field. Hence, it becomes important and crucial to identify where exactly the problem lies, e.g., whether the contactless card or the reader configuration has issues depending on the command(s) exchanged. Accordingly, one crucial information required for evaluating the contactless payment transaction is communication chip interaction during the transaction.

Currently, technologies/tools exist for capturing traces of the contactless chip interaction which are compliant to NFC standards such as those used in secure payment transaction, NFC stickers, secure door access, and the like. However, these tools require additional hardware components which are generally very expensive.

Hence, currently there exists no cost-efficient way of capturing traces of contactless card communication interaction. Thus, what is needed is a cost-efficient and effective environment for capturing data exchange during the course of contactless chip interaction which can be used to debug a problem.

The information disclosed in this background of the disclosure section is only for enhancement of understanding of the general background of the disclosure and should not be taken as an acknowledgement or any form of suggestion that this information forms the existing technology already known to a person skilled in the art.

SUMMARY

Additional features and advantages are realized through the techniques of the present disclosure. Other embodiments and aspects of the disclosure are described in detail herein and are considered a part of the claimed disclosure.

In some non-limiting embodiments or aspects, provided is a method of capturing contactless communication interactions for debugging and evaluating a contactless card transaction, the method comprising: receiving, by a reader device, Near Field Communication (NFC) signaling from a contactless card, wherein the NFC signal indicates data associated with the contactless card; initiating, by a card emulation device, a contactless transaction between the card emulation device and a payment device, upon receiving the NFC signal, wherein the card emulation device emulates functionalities of the contactless card; obtaining by the card emulation device, Application Protocol Data Unit (APDU) commands from the payment device in response to the initiation of the contactless transaction, wherein the APDU commands are transmitted to the reader device; providing, by the reader device, the APDU commands to the contactless card, and in response, detecting and receiving an APDU response from the contactless card, wherein the reader device transmits the APDU response to the card emulation device; and transmitting, by the card emulation device, the APDU response of the contactless card to the payment device, wherein the APDU command and APDU response are stored in each of the reader device and the card emulation device for debugging and evaluating the contactless card transaction.

In some non-limiting embodiments or aspects, the contactless card comprises at least one of the following: a smart card, a smart NFC Subscriber Identification Module (SIM) reader, a digital wallet application, a smart wearable, a virtual card, an NFC tag, a sticker, or any combination thereof. In some non-limiting embodiments or aspects, the reader device comprises one of an NFC card reader device configured with a computing device and a mobile device with in-built NFC capabilities. In some non-limiting embodiments or aspects, the reader device is the NFC card reader device configured with the computing device, and the computing device communicates with the card emulation device. In some non-limiting embodiments or aspects, the card emulation device comprises a mobile device with in-built NFC capabilities. In some non-limiting embodiments or aspects, the reader device and the card emulation device are communicatively connected with each other.

In some non-limiting embodiments or aspects, provided is a system for capturing contactless communication interactions for debugging and evaluating a contactless card transaction, the system comprising: a reader device for receiving Near Field Communication (NFC) signaling from a contactless card, wherein the NFC signal indicates data associated with the contactless card; and a card emulation device for initiating a contactless transaction between the card emulation device and a payment device, wherein the card emulation device emulates functionalities of the contactless card, obtains Application Protocol Data Unit (APDU) commands from the payment device in response to the initiation of the contactless transaction, and transmits the APDU commands to the reader device; wherein upon receiving the APDU commands, the reader device transmits the APDU commands to the contactless card, and in response, detects and receives an APDU response from the contactless card, and transmits the APDU response to the card emulation device, and in response to receiving the APDU response, the card emulation device transmits the APDU response of the contactless card to the payment device, wherein the APDU command and APDU response are stored in each of the reader device and the card emulation device for debugging and evaluating the contactless card transaction.

In some non-limiting embodiments or aspects, the contactless card comprises at least one of the following: a smart card, a smart NFC Subscriber Identification Module (SIM) reader, a digital wallet application, a smart wearable, a virtual card, an NFC tag, a sticker, or any combination thereof. In some non-limiting embodiments or aspects, the reader device comprises one of an NFC card reader device configured with a computing device and a mobile device with in-built NFC capabilities. In some non-limiting embodiments or aspects, when the reader device is the NFC card reader device configured with the computing device, and the computing device communicates with the card emulation device. In some non-limiting embodiments or aspects, the card emulation device comprises a mobile device with in-built NFC capabilities. In some non-limiting embodiments or aspects, the reader device and the card emulation device are communicatively connected with each other.

Further non-limiting embodiments or aspects are set forth in the following numbered clauses:

Clause 1: A method of capturing contactless communication interactions for debugging and evaluating a contactless card transaction, the method comprising: receiving, by a reader device, Near Field Communication (NFC) signaling from a contactless card, wherein the NFC signal indicates data associated with the contactless card; initiating, by a card emulation device, a contactless transaction between the card emulation device and a payment device, upon receiving the NFC signal, wherein the card emulation device emulates functionalities of the contactless card; obtaining by the card emulation device, Application Protocol Data Unit (APDU) commands from the payment device in response to the initiation of the contactless transaction, wherein the APDU commands are transmitted to the reader device; providing, by the reader device, the APDU commands to the contactless card, and in response, detecting and receiving an APDU response from the contactless card, wherein the reader device transmits the APDU response to the card emulation device; and transmitting, by the card emulation device, the APDU response of the contactless card to the payment device, wherein the APDU command and APDU response are stored in each of the reader device and the card emulation device for debugging and evaluating the contactless card transaction.

Clause 2: The method of clause 1, wherein the contactless card comprises at least one of the following: a smart card, a smart NFC Subscriber Identification Module (SIM) reader, a digital wallet application, a smart wearable, a virtual card, a Near Field Communication (NFC) tag, a sticker, or any combination thereof.

Clause 3: The method of clause 1 or 2, wherein the reader device comprises one of an NFC card reader device configured with a computing device and a mobile device with in-built NFC capabilities.

Clause 4: The method of any of clauses 1-3, wherein when the reader device is the NFC card reader device configured with the computing device, and the computing device communicates with the card emulation device.

Clause 5: The method of any of clauses 1-4, wherein the card emulation device comprises a mobile device with in-built NFC capabilities.

Clause 6: The method of any of clauses 1-5, wherein the reader device and the card emulation device are communicatively connected with each other.

Clause 7: A system for capturing contactless communication interactions for debugging and evaluating a contactless card transaction, the system comprising: a reader device for receiving Near Field Communication (NFC) signaling from a contactless card, wherein the NFC signal indicates data associated with the contactless card; and a card emulation device for initiating a contactless transaction between the card emulation device and a payment device, wherein the card emulation device emulates functionalities of the contactless card, and obtains Application Protocol Data Unit (APDU) commands from the payment device in response to the initiation of the contactless transaction, and transmits the APDU commands to the reader device; wherein upon receiving the APDU commands, the reader device transmits the APDU commands to the contactless card, and in response, detects and receives an APDU response from the contactless card, and transmits the APDU response to the card emulation device, and in response to receiving the APDU response, the card emulation device transmits the APDU response of the contactless card to the payment device, wherein the APDU command and APDU response are stored in each of the reader device and the card emulation device for debugging and evaluating the contactless card transaction.

Clause 8: The system of clause 7, wherein the contactless card comprises at least one of the following: a smart card, a smart NFC Subscriber Identification Module (SIM) reader, a digital wallet application, a smart wearable, a virtual card, a Near Field Communication (NFC) tag, a sticker, or any combination thereof.

Clause 9: The system of clause 7 or 8, wherein the reader device comprises one of an NFC card reader device configured with a computing device and a mobile device with in-built NFC capabilities.

Clause 10: The system of any of clauses 7-9, wherein when the reader device is the NFC card reader device configured with the computing device, and the computing device communicates with the card emulation device.

Clause 11: The system of any of clauses 7-10, wherein the card emulation device comprises a mobile device with in-built NFC capabilities.

Clause 12: The system of any of clauses 7-11, wherein the reader device and the card emulation device are communicatively connected with each other.

Disclosed herein is a computer-implemented method for capturing contactless communication interactions for debugging and evaluating a contactless card transaction. In some non-limiting embodiments or aspects, the method may include receiving, by a reader device, Near Field Communication (NFC) signaling from a contactless card, wherein the NFC signal indicates data associated with the contactless card. Upon receiving the NFC signal, initiating, by a card emulation device, a contactless transaction between the card emulation device and a payment device. The card emulation device emulates functionalities of the contactless card. The method includes obtaining, by the card emulation device, Application Protocol Data Unit (APDU) commands from the payment device in response to the initiation of the contactless transaction. The APDU commands are transmitted to the reader device. Further, the method includes providing, by the reader device, the APDU commands to the contactless card, and in response, detecting and receiving an APDU response from the contactless card. The reader device transmits the APDU response to the card emulation device. Thereafter, the method includes transmitting, by the card emulation device, the APDU response of the contactless card to the payment device. The APDU command and APDU response are stored in each of the reader device and the card emulation device for debugging and evaluating the contactless card transaction.

Further, the present disclosure includes a system for capturing contactless communication interactions for debugging and evaluating a contactless card transaction. The system comprises a reader device for receiving Near Field Communication (NFC) signaling from a contactless card. The NFC signal indicates data associated with the contactless card. Further, the system comprises a card emulation device for initiating a contactless transaction between the card emulation device and a payment device, wherein the card emulation device emulates functionalities of the contactless card, and obtains Application Protocol Data Unit (APDU) commands from the payment device in response to the initiation of the contactless transaction, and transmits the APDU commands to the reader device. Upon receiving the APDU commands, the reader device transmits the APDU commands to the contactless card, and in response, detects and receives an APDU response from the contactless card, and transmits the APDU response to the card emulation device. In response to receiving the APDU response, the card emulation device transmits the APDU response of the contactless card to the payment device. The APDU command and APDU response are stored in each of the reader device and the card emulation device for debugging and evaluating the contactless card transaction.

The foregoing summary is illustrative only and is not intended to be in any way limiting. In addition to the illustrative aspects, embodiments, and features described above, further aspects, embodiments, and features may become apparent by reference to the drawings and the following detailed description.

BRIEF DESCRIPTION OF THE DRAWINGS

The novel features and characteristics of the disclosure are set forth in the appended claims. The disclosure itself, however, as well as a preferred mode of use, further objectives and advantages thereof, may best be understood by reference to the following detailed description of an illustrative embodiment when read in conjunction with the accompanying drawings. The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. One or more embodiments are now described, by way of example only, with reference to the accompanying figures wherein like reference numerals represent like elements and in which:

FIGS. 1A-1C are exemplary environments for capturing contactless communication interactions for debugging and evaluating a contactless card transaction, in accordance with some embodiments of the present disclosure;

Figure 2A:
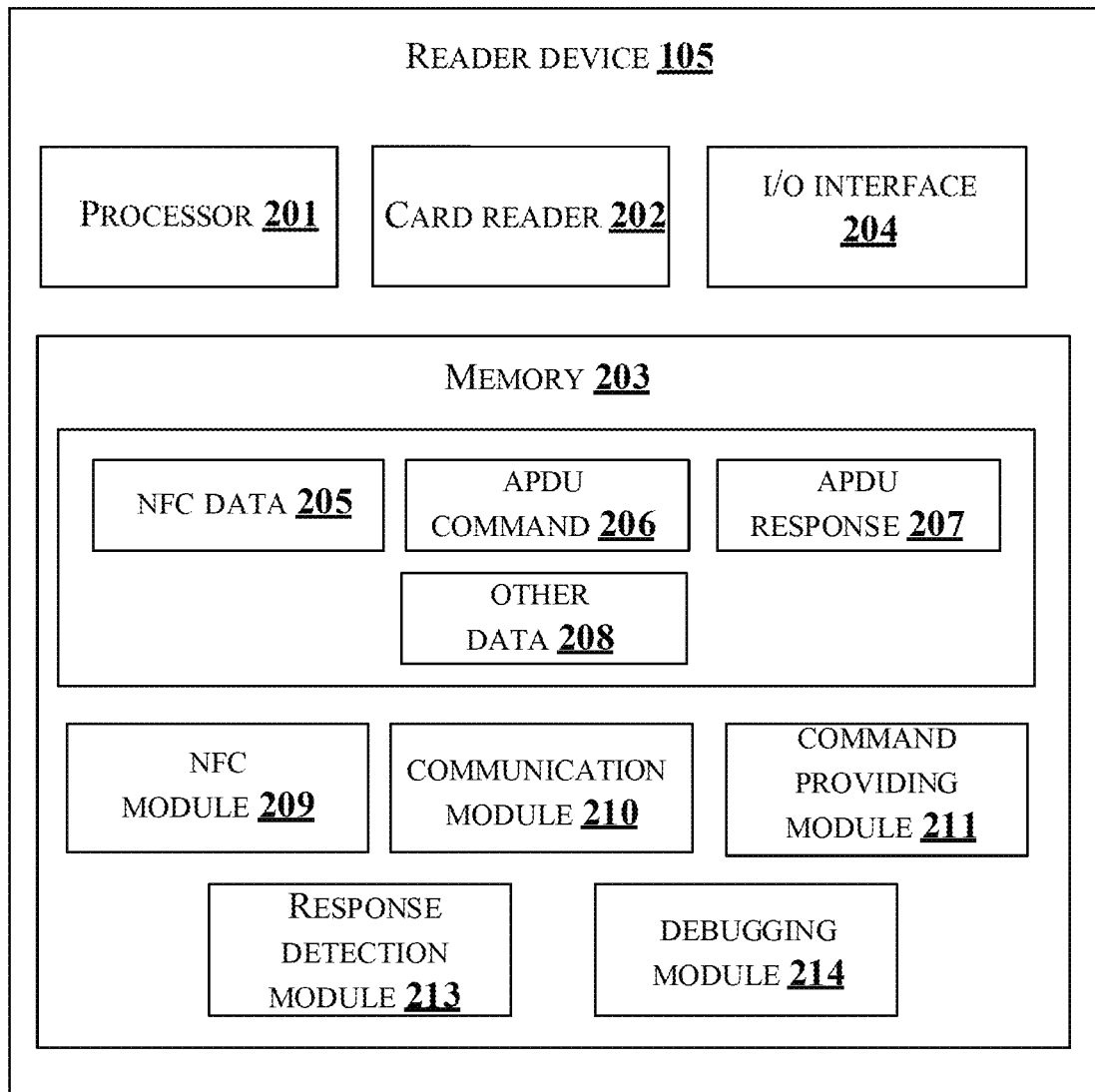
FIG. 2A is an exemplary detailed block diagram of a reader device, in accordance with some non-limiting embodiments or aspects of the present disclosure.

It should be appreciated by those skilled in the art that any block diagrams herein represent conceptual views of illustrative systems embodying the principles of the present subject matter. Similarly, it may be appreciated that any flow charts, flow diagrams, state transition diagrams, pseudo code, and the like represent various processes which may be substantially represented in computer-readable medium and executed by a computer or processor, whether or not such computer or processor is explicitly shown. While each of the figures illustrates a particular embodiment for purposes of illustrating a clear example, other embodiments may omit, add to, reorder, and/or modify any of the elements shown in the figures.

DETAILED DESCRIPTION

In the present document, the term "exemplary" is used herein to mean "serving as an example, instance, or illustration." Any embodiment, aspect, or implementation of the present subject matter described herein as "exemplary" is not necessarily to be construed as preferred or advantageous over other embodiments.

In the following detailed description of non-limiting embodiments or aspects of the disclosure, reference is made to the accompanying drawings that form a part hereof, and in which are shown by way of illustration specific embodiments in which the disclosure may be practiced. It should be understood, however, that it is not intended to limit the disclosure to the forms disclosed, but on the contrary, the disclosure is to cover all modifications, equivalents, and alternatives falling within the spirit and the scope of the disclosure. It is to be understood that other embodiments may be utilized and that changes may be made without departing from the scope of the present disclosure. The following description is, therefore, not to be taken in a limiting sense.

The terms "comprises", "comprising", or any other variations thereof are intended to cover a non-exclusive inclusion such that a setup, device, or method that comprises a list of components or steps does not include only those components or steps but may include other components or steps not expressly listed or inherent to such setup, device, or method. In other words, one or more elements in a system or apparatus proceeded by "comprises . . . a" do not, without more constraints, preclude the existence of other elements or additional elements in the system or method.

The terms "includes", "including", or any other variations thereof are intended to cover a non-exclusive inclusion such that a setup, device, or method that includes a list of components or steps does not include only those components or steps but may include other components or steps not expressly listed or inherent to such setup, device, or method. In other words, one or more elements in a system or apparatus proceeded by "includes . . . a" do not, without more constraints, preclude the existence of other elements or additional elements in the system or method.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has", "have", "having", or the like are intended to be open-ended terms. Further, the phrase "based on" is intended to mean "based at least in partially on" unless explicitly stated otherwise. The term "some non-limiting embodiments or aspects" means "one or more (but not all) embodiments or aspects of the disclosure(s)" unless expressly specified otherwise. A description of some non-limiting embodiments or aspects with several components in communication with each other does not imply that all such components are required. On the contrary, a variety of optional components is described to illustrate the wide variety of possible embodiments of the disclosure.

When a single device or article is described herein, it may be readily apparent that more than one device/article (whether or not they cooperate) may be used in place of a single device/article. Similarly, where more than one device or article is described herein (whether or not they cooperate), it may be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/feature. Thus, other embodiments of the disclosure need not include the device itself.

As used herein, the terms "communication", "communicate", "send", and/or "receive" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments or aspects, a message may refer to a network packet (e.g., a data packet and/or the like) that includes data. It will be appreciated that numerous other arrangements are possible.

As used herein, the terms "server" and/or "processor" may refer to one or more computing devices or computing units, such as processors, storage devices, and/or similar computer components, that communicate with client devices and/or other computing devices over a network, such as the Internet or private networks, and, in some examples, facilitate communication among other servers and/or client devices. It will be appreciated that various other arrangements are possible. As used herein, the term "system" may refer to one or more computing devices or combinations of computing devices such as but not limited to, processors, servers, client devices, software applications, and/or other like components. In addition, reference to "a server" or "a processor", as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

Non-limiting embodiments or aspects of the present disclosure are directed to a method and a system for capturing contactless communication interactions for debugging and evaluating a contactless card transaction. With advancement in computer technology, contactless cards are becoming more and more widespread and used, among others, as tokens for access control of protected facilities and environments, as electronic identity documents, as payment cards, and as electronic tickets.

Since payment transactions are performed contactless today, there is a need to acquire a technology that can easily capture data exchange within those contactless interactions. Primarily, these techniques are required to debug and isolate a field problem in existing contactless communication protocols. One crucial information required for evaluating the contactless payment transaction is communication chip interaction during the transaction. Currently, technologies/tools exist for capturing traces of the contactless chip interaction which are compliant to NFC standards such as those used in secure payment transaction, NFC stickers, secure door access, and the like. However, these tools require additional hardware components which are generally very expensive.

Thus, the present disclosure involves use of widely available mobile devices with NFC capabilities for capturing contactless communication interactions for debugging and evaluating a contactless card transaction. Particularly, the present disclosure utilizes one mobile device which acts as a card emulation device and emulates functionalities of the contactless card, and another device which acts as a reader device for reading the contactless card. Thus, the present disclosure enables effective management and control of the devices which directly interact with the contactless real card and a real reader device.

Non-limiting embodiments or aspects of the present disclosure have several advantages. For example, embodiments simplify an approach of capturing a contactless card interaction which helps in debugging and evaluating a payment transaction. Furthermore, embodiments are more convenient and can be easily accessed and implemented due to usage of available mobile devices. Thus, the present disclosure eliminates the need of complex and overhead of additional hardware components for testing and debugging contactless card payments. Accordingly, embodiments provide a more secure and convenient method for capturing contactless communication interactions.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIGS. 1A-1C show exemplary environments for capturing contactless communication interactions for debugging and evaluating a contactless card transaction, in accordance with some non-limiting embodiments or aspects of the present disclosure.

As shown in FIG. 1A, an environment 100 includes a system 101 which can communicatively connect with a contactless card 103 and communicatively connected to a payment device 109. In some non-limiting embodiments or aspects, the contactless card 103 is a physical card that is part of a contactless payment system and allows transactions through a chip embedded in payment cards, tags, key fobs, or mobile devices. A chip or QR code in the contactless cards communicate using radio frequency or Near Field Communication (NFC) standards. The contactless card 103 may be any form of contactless payment cards such as traditional smart cards, digital wallet applications such as Apple Pay®, Google Pay®, smart wearables, smart NFC Subscriber Identification Module (SIM) readers, virtual cards, NFC tags, and stickers. The system 101 includes a reader device 105 and a card emulation device 107. The reader device 105 may be implemented in one or more configurations. In one implementation, as shown in FIG. 1B, the reader device comprises one of an NFC card reader device 111 configured with a computing device 113. In another implementation, as shown in FIG. 1C, the reader device may be a mobile device 115 with in-built NFC capability. Further, the card emulation device 107 is a mobile device with NFC capability and which emulates functionalities of the contactless card 103. In some non-limiting embodiments or aspects, both the mobile device 115 and card emulation device 107 are a mobile phone.

To initiate with a contactless transaction, the reader device 105 is initialized. For instance, if the reader device 105 is as per the implementation shown in FIG. 1B, the NFC card reader device 111, such as a Personal Computer System (PC/SC) reader device, is initialized in association with the computing device 113. The computing device 113 may include, but is not limited to, a desktop computer, a notebook, a laptop, or any other computing devices. A person skilled in the art would understand that any other computing devices, not mentioned explicitly, may also be used in the present disclosure. Likewise, if the reader device 105 is as per the implementation shown in FIG. 1C, the mobile device 115 is initialized for the transaction. Upon initialization, a transaction is initiated by a user of the contactless card 103 by multiple options such as either placing the contactless card 103 on top of the reader device 105, tapping the reader device 105, or scanning using QR codes/smart digital application and the like (either the NFC card reader device 111 or the mobile device 115). Upon the transaction being initiated, the reader device 105 receives NFC signaling from the contactless card 103. The NFC signal indicates data associated with the contactless card 103 such as customer identification details, payment details, and the like. Once the NFC signal is received, the reader device 105 indicates to the card emulation device 107 and the card emulation device 107 is initialized, which on initialization initiates a contactless transaction with the payment device 109. In some non-limiting embodiments or aspects, the payment device 109 may be a POS terminal or the like. The contactless transaction is initiated by placing/tapping the card emulation device 107 on the payment device 109.

In response to the contactless transaction, the card emulation device 107 may obtain APDU commands from the payment device 109. Typically, the APDU is defined as a command response protocol for invoking functions executed on a smart card or similar devices. The APDU protocol and format is as per existing known format. On receiving the APDU commands, the card emulation device 107 transmits to the APDU commands to the reader device 105. On receiving the APDU commands, the reader device 105 provides the APDU commands to the contactless card 103. In response to the APDU commands, the reader device 105 detects and receives an APDU response from the contactless card 103. The reader device 105 transmits the received APDU response to the card emulation device 107. Thereafter, the card emulation device 107 transmits the APDU response of the contactless card 103 to the payment device 109. Thus, the APDU command and APDU response are each stored in each of the reader device 105 and the card emulation device 107 for debugging and evaluating the contactless card transaction.

FIG. 2A shows an exemplary detailed block diagram of a reader device, in accordance with non-limiting embodiments or aspects of the present disclosure.

As shown in FIG. 2A, the reader device 105 may include a processor 201, a card reader 202, and a memory 203 for storing instructions executable by the processor 201. The processor 201 may comprise at least one data processor for executing program components for executing user or system-generated requests. The memory 203 is communicatively coupled to the processor 201. The reader device 105 further comprises an Input/Output (I/O) interface 204. The I/O interface 204 is coupled with the processor 201 through which an input signal or/and an output signal is communicated.

In some non-limiting embodiments or aspects, data stored in the memory 203 may include NFC data 205, an APDU command 206, an APDU response 207, and other data 208. The NFC data 205 comprises NFC signal information received from the contactless card 103. The NFC signals carry the data associated with the contactless card 103. The data includes customer identification details, payment information, and the like.

The APDU command 206 comprises the APDU command received from the payment device 109 through the card emulation device 107. The APDU command is received in response to contactless transaction initiated by the card emulation device 107 in respect of the NFC signals. For the implementation as shown in FIG. 1B, the APDU command 206 is stored in the computing device 113. For the implementation shown in FIG. 1C, the APDU command 206 is stored in the mobile device 115. The APDU response 207 includes a response received from the contactless card 103 in response to the APDU command 206 from the payment device 109. For the implementation as shown in FIG. 1B, the APDU response 207 is stored in the computing device 113. For the implementation shown in FIG. 1C, the APDU response 207 is stored in the mobile device 115.

In some non-limiting embodiments or aspects, other data 208 may include initialization information for the reader device 105. In some non-limiting embodiments or aspects, the reader device 105 may include an NFC module 209, a communication module 210, a command providing module 211, a response detection module 213 and a debugging module 214.

The reader device 105 disclosed in FIG. 2A is depicted as a combination of implementations disclosed in FIG. 1B and FIG. 1C. One or more data/components/modules may be present separately based on the configuration. For instance, the card reader 202 is associated with the reader device 105 as per implementation shown in FIG. 1B. The card reader 202 is not configured for the reader device 105 as shown in FIG. 1C.

The NFC module 209 is configured and associated with the mobile device 115 and is used for receiving NFC signals from the contactless card 103. The NFC module 209 may be any configurable chip on the mobile device 115. The communication module 210 is responsible for receiving information from the card emulation device 107. Further, the communication module 210 may be responsible for transmitting information such as and APDU response to the card emulation device 107. The communication module 210 may include a wireless interface for communicating with the payment device 109 and the card emulation device 107.

The command providing module 211 may provide the APDU command received from the card emulation device 107 to the contactless card 103. The response detection module 213 may detect the APDU response from the contactless card 103 in response to the APDU command. The debugging module 214 may use the APDU command and the APDU response for debugging and evaluating the contactless card transaction.

Figure 2B:
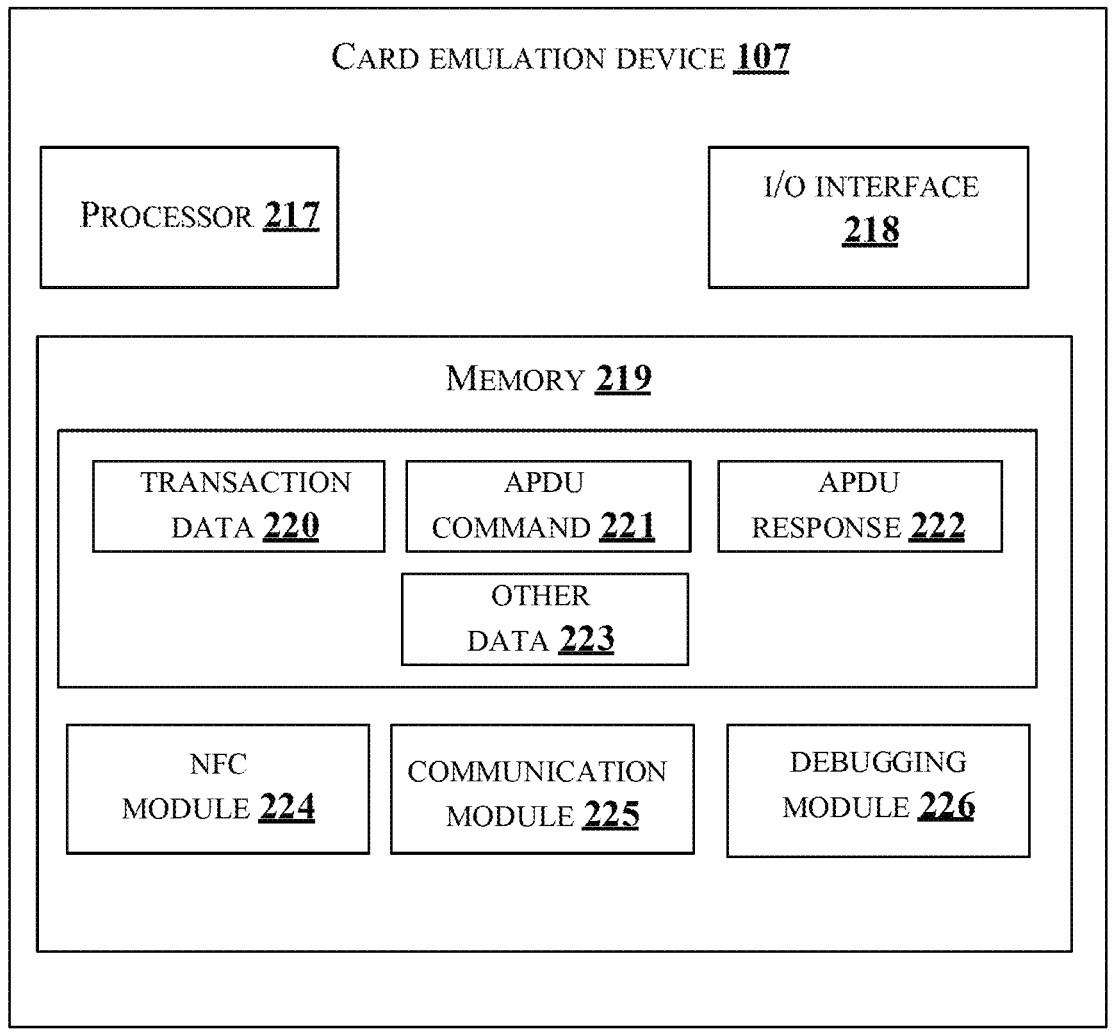
FIG. 2B is an exemplary detailed block diagram of a card emulation device, in accordance with some non-limiting embodiments or aspects of the present disclosure.

FIG. 2B shows an exemplary detailed block diagram of a card emulation device, in accordance with some non-limiting embodiments or aspects of the present disclosure.

As shown in FIG. 2B, the card emulation device 107 may include a processor 217 and a memory 219 for storing instructions executable by the processor 217. The processor 217 may comprise at least one data processor for executing program components for executing user or system-generated requests. The memory 219 is communicatively coupled to the processor 217. The card emulation device 107 further comprises an Input/Output (I/O) interface 218. The I/O interface 218 is coupled with the processor 217 through which an input signal or/and an output signal is communicated.

In some non-limiting embodiments or aspects, data stored in the memory 219 may include transaction data 220, an APDU command 221, an APDU response 222, and other data 223. The transaction data 220 may include information about the transaction initiated by the contactless card 103. The APDU command 221 comprises the APDU command received from the payment device 109 upon initiating the contactless transaction. The APDU response 222 includes a response of the contactless card 103 in response to the APDU command 206 from the payment device 109. In some non-limiting embodiments or aspects, other data 223 may include initialization information. In some non-limiting embodiments or aspects, the card emulation device 107 may include an NFC module 224, a communication module 225, and a debugging module 226.

The NFC module 224 is configured for receiving NFC signals from the contactless card 103. Further, the NFC module 224 may be used for transmitting NFC signals to the payment device 109 for initiating the contactless transaction. The NFC module 224 may be any configurable chip on the card emulation device 107. The communication module 225 is responsible for receiving information from the reader device 105. Further, the communication module 225 may be responsible for transmitting information such as an APDU command to the reader device 105 and an APDU response to the payment device 109. The communication module 225 may include a wireless interface for communicating with the payment device 109 and the reader device 105. The debugging module 226 may use the APDU command and the APDU response for debugging and evaluating the contactless card transaction.

Figure 3A:
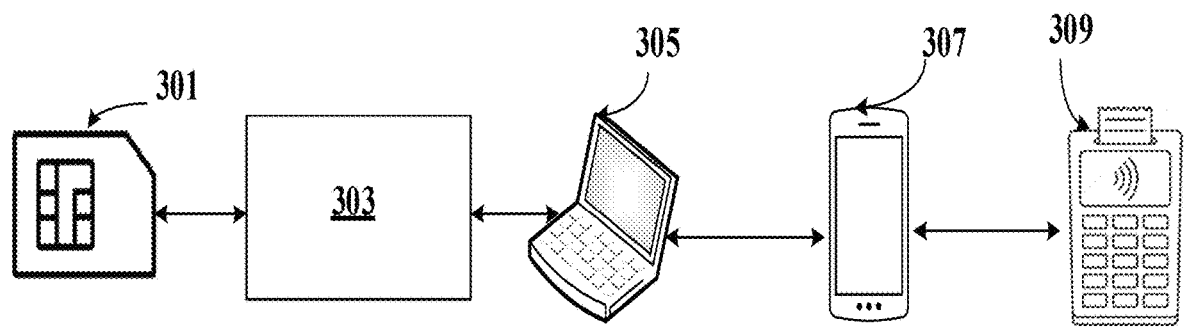
FIGS. 3A-3B are exemplary embodiments of capturing contactless communication interaction using an NFC SIM and a virtual card, respectively, in accordance with some non-limiting embodiments or aspects of the present disclosure.
Figure 3B:
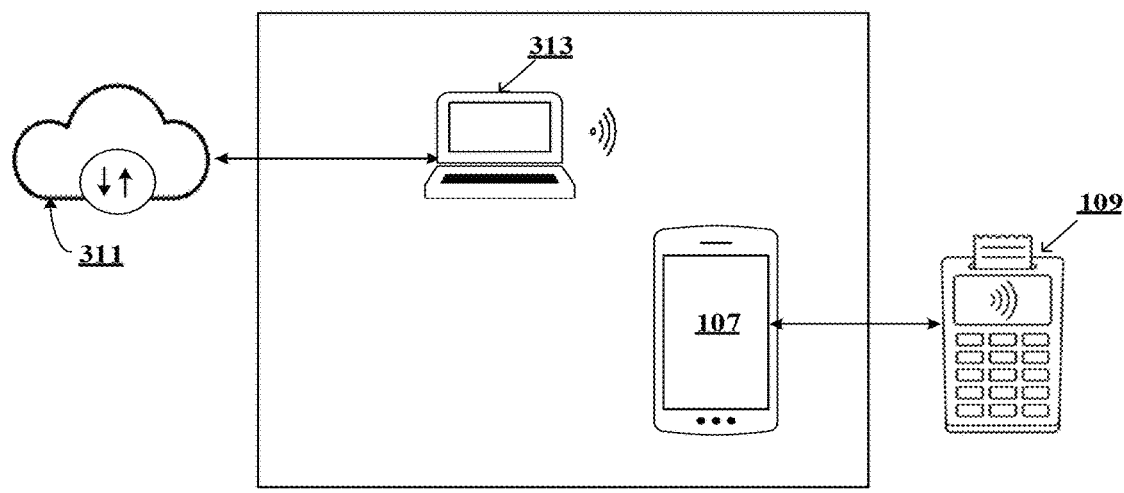

FIGS. 3A-3B show exemplary embodiments of capturing a contactless communication interaction using an NFC SIM and a virtual card, respectively, in accordance with some non-limiting embodiments or aspects of the present disclosure.

FIG. 3A shows an exemplary embodiment when the contactless card 103 is an NFC SIM 301. The NFC SIM 301 merely initiates a transaction and is without any antenna configuration. The NFC SIM 301 is connected with a transmitting device 303 such as a microprocessor through a Single Wire Protocol (SWP). The transmitting device 303 is connected through a computing device 305, such as a laptop/desktop device, which in turn is connected with a card emulation device 307. The card emulation device 307 is connected with a POS device 309 for initiating the contactless transaction. Information received from the NFC SIM 301 is transmitted by the transmitting device 303 to the computing device 305.

In FIG. 3B, the contactless card is a virtual card 311. Typically, a virtual card is a "virtual" or digital representation of a consumer card which may reside in a host cloud or another system which includes an application that emulates APDU commands. Thus, the information received from the virtual card 311 may be received by a reader device 313, which is communicatively connected with the card emulation device 107 for initiating the contactless transaction.

Figure 4:
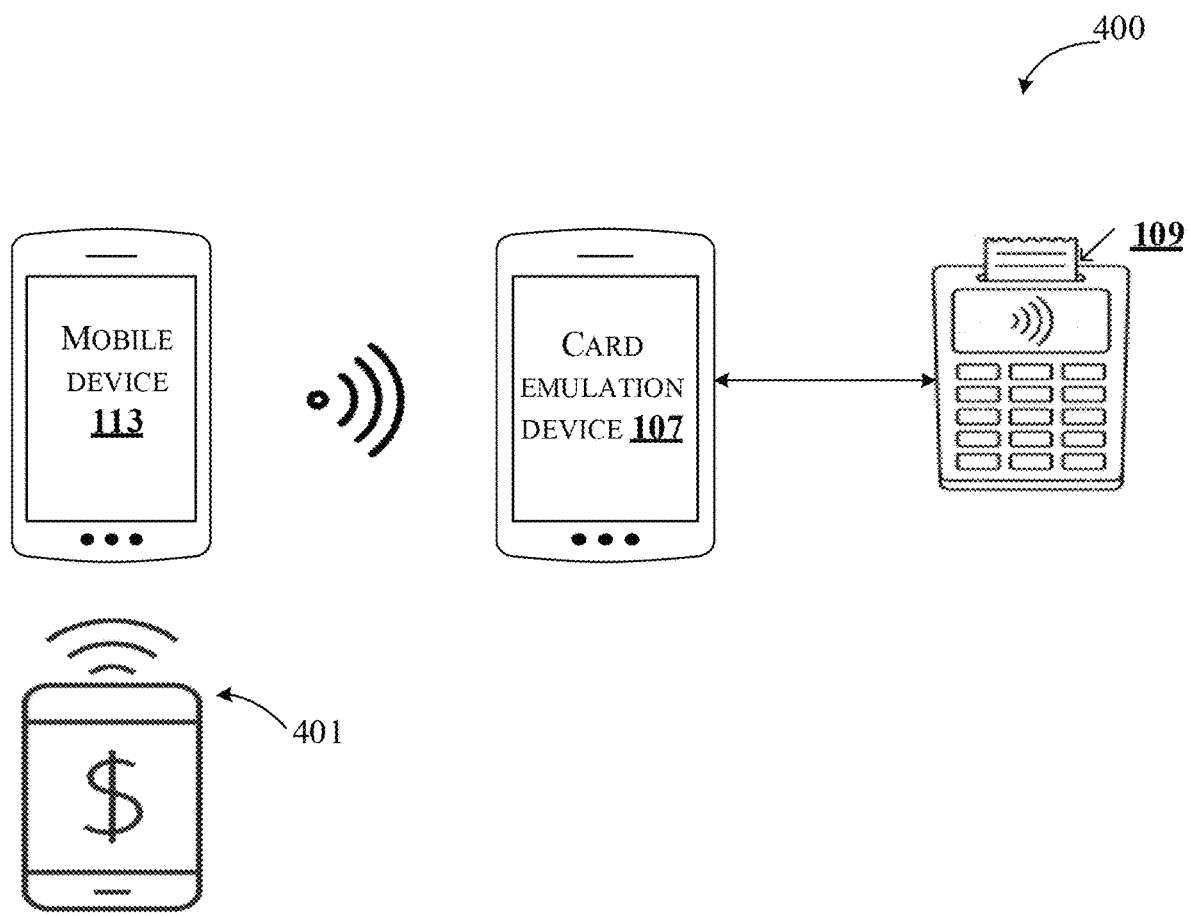
FIG. 4 is an exemplary scenario of capturing contactless communication interactions for debugging and evaluating a contactless card transaction, in accordance with some non-limiting embodiments or aspects of the present disclosure.

FIG. 4 shows an exemplary scenario of capturing contactless communication interactions for debugging and evaluating a contactless card transaction, in accordance with some non-limiting embodiments or aspects of the present disclosure.

Referring now to FIG. 4, an exemplary representation 400 of capturing a contactless communication is illustrated. The exemplary representation 400 includes the mobile device 115 acting as the reader device, the card emulation device 107, the payment device 109, and a mobile device 401 of a user for initiating a transaction through a digital wallet application on the mobile device 401. The contactless transaction is initiated by using the digital wallet application. Thus, in such case, the digital wallet application on the mobile device 401 acts as the contactless card 103, as disclosed in the previous figures. The user of the mobile device 401 may initiate a transaction by using the digital application, particularly by tapping on the mobile device 115. Once the transaction is initiated, the mobile device 115 receives NFC signaling from the mobile device 401. The NFC signal indicates data associated with the contactless payment such as customer identification details, payment details, and the like. Once the NFC signal is received, the mobile device 115 indicates the NFC signal to the card emulation device 107, which on initialization initiates a contactless transaction with the payment device 109. The contactless transaction is initiated by placing/tapping the card emulation device 107 on the payment device 109. In response to the contactless transaction, the card emulation device 107 may obtain the APDU commands from the payment device 109. On receiving the APDU commands, the card emulation device 107 transmits the APDU commands to the mobile device 115. On receiving the APDU commands, the mobile device 115 provides the APDU commands to the digital wallet application on the mobile device 401 of the user. In response to the APDU commands, the mobile device 115 detects and receives the APDU response from the digital wallet application of the mobile device 401 and transmits to the card emulation device 107. Thereafter, the card emulation device 107 transmits the APDU response to the payment device 109. Thus, the APDU command and APDU response are each stored in each of the mobile device 115 and the card emulation device 107 for debugging and evaluating the contactless card transaction.

Figure 5:
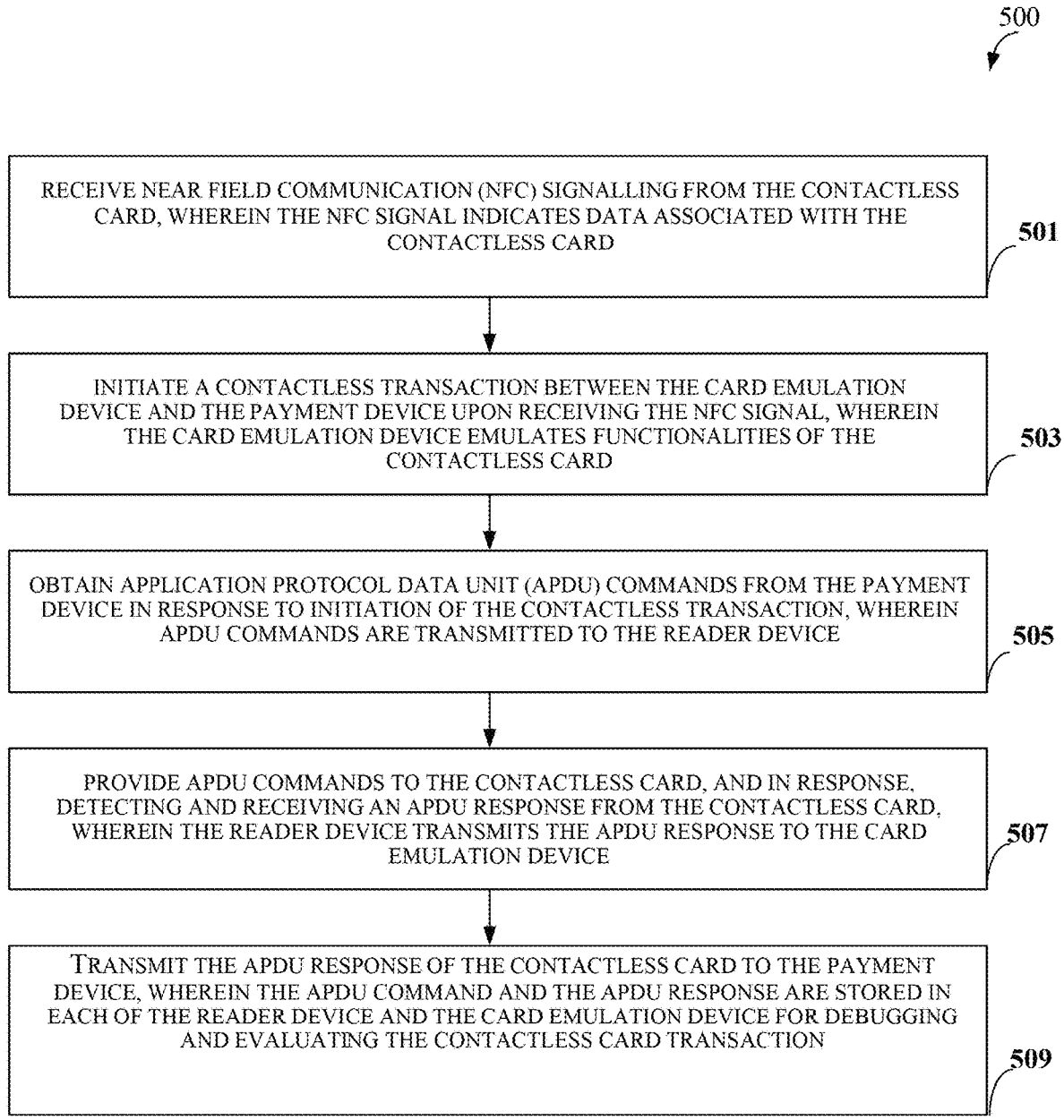
FIG. 5 is a flow chart illustrating method steps for capturing contactless communication interactions for debugging and evaluating a contactless card transaction, in accordance with some non-limiting embodiments or aspects of the present disclosure.

FIG. 5 shows a flow chart illustrating method steps for capturing contactless communication interactions for debugging and evaluating a contactless card transaction, in accordance with some non-limiting embodiments or aspects of the present disclosure.

The order in which the method 500 is described is not intended to be construed as a limitation, and any number of the described method blocks may be combined in any order to implement the method. Additionally, individual blocks may be deleted from the methods without departing from the spirit and scope of the subject matter described herein. Furthermore, the method may be implemented in any suitable hardware, software, firmware, or combination thereof.

At block 501, the reader device 105 receives the NFC signaling from the contactless card 103. The NFC signal indicates data associated with the contactless card 103. In some non-limiting embodiments or aspects, the contactless card 103 may include or be in the form of a smart card, a smart NFC SIM reader, a digital wallet application, a smart wearable, a virtual card, a NFC tag, a sticker, or any combination thereof.

At block 503, the card emulation device 107 initiates the contactless transaction with the payment device 109, upon receiving the NFC signal, the card emulation device 107 being emulating functionalities of the contactless card 103.

At block 505, the card emulation device 107 obtains the APDU commands from the payment device 109 in response to the initiation of the contactless transaction. The obtained APDU commands are transmitted to the reader device 105 by the card emulation device 107.

At block 507, the reader device 105 provides the APDU commands to the contactless card 103, and in response, detects and receives the APDU response from the contactless card 103. The detected APDU response is transmitted by the reader device 105 to the card emulation device 107.

At block 509, the card emulation device 107 transmits the APDU response of the contactless card 103 to the payment device 109. In some non-limiting embodiments or aspects, the APDU command and APDU response are stored in each of the reader device 105 and the card emulation device 107 for debugging and evaluating the contactless card transaction.

One or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, e.g., non-transitory. Examples include Random Access Memory (RAM), Read-Only Memory (ROM), volatile memory, non-volatile memory, hard drives, Compact Disc (CD) ROMs, Digital Video Disc (DVDs), flash drives, disks, and any other known physical storage media.

The described operations may be implemented as a method, system, or article of manufacture using standard programming and/or engineering techniques to produce software, firmware, hardware, or any combination thereof. The described operations may be implemented as code maintained in a "non-transitory computer-readable medium", where a processor may read and execute the code from the computer-readable medium. The processor is at least one of a microprocessor and a processor capable of processing and executing the queries. A non-transitory computer-readable medium may include media, such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, and the like), and the like. Further, non-transitory computer-readable media may include all computer-readable media except for a transitory. The code implementing the described operations may further be implemented in hardware logic (e.g., an integrated circuit chip, Programmable Gate Array (PGA), Application ASIC, and the like).

An "article of manufacture" includes non-transitory computer-readable medium and/or hardware logic in which code may be implemented. A device in which the code implementing the described embodiments of operations is encoded may include a computer-readable medium or hardware logic. Of course, those skilled in the art will recognize that many modifications may be made to this configuration without departing from the scope of the disclosure and that the article of manufacture may include suitable information bearing medium known in the art.

The terms "some non-limiting embodiments or aspects", "embodiment", "embodiments", "the embodiment", "the embodiments", "one or more embodiments", "some-non-limiting embodiments or aspects", and "some non-limiting embodiments or aspects" mean "one or more (but not all) embodiments of the disclosure(s)" unless expressly specified otherwise. A description of some non-limiting embodiments or aspects with several components in communication with each other does not imply that all such components are required. On the contrary, a variety of optional components is described to illustrate the wide variety of possible embodiments of the disclosure.

The terms "including", "comprising", "having", and variations thereof mean "including but not limited to" unless expressly specified otherwise. The enumerated listing of items does not imply that any or all of the items are mutually exclusive unless expressly specified otherwise. The terms "a", "an", and "the" mean "one or more" unless expressly specified otherwise. A description of some non-limiting embodiments or aspects with several components in communication with each other does not imply that all such components are required. On the contrary, a variety of optional components is described to illustrate the wide variety of possible embodiments of the disclosure.

The illustrated operations of FIG. 5 show certain events occurring in a certain order. In alternative embodiments, certain operations may be performed in a different order, modified, or removed. Moreover, steps may be added to the above-described logic and still conform to the described embodiments. Further, operations described herein may occur sequentially or certain operations may be processed in parallel. Yet further, operations may be performed by a single processing unit or by distributed processing units.

A description of some non-limiting embodiments or aspects with several components in communication with each other does not imply that all such components are required. On the contrary, a variety of optional components is described to illustrate the wide variety of possible embodiments of the disclosure.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments of the disclosure is intended to be illustrative, but not limiting, of the scope of the disclosure, which is set forth in the following claims.

The present disclosure simplifies the approach of capturing contactless card interaction which helps in debugging and evaluating payment transactions. Furthermore, non-limiting embodiments or aspects are more convenient and can be easily accessed and implemented due to usage of available mobile devices. Thus, the present disclosure eliminates the need of complex and overhead of additional hardware components for testing and debugging contactless card payments. Accordingly, non-limiting embodiments or aspects provide a more secure and convenient method for capturing contactless communication interactions.

Some non-limiting embodiments or aspects of the present disclosure helps to analyze and debug pilot deployments of new issuer products. Such deployments usually require re-personalization of a card profile or updates to existing applet(s). At times, this setup requires a trial-and-error approach in card profile personalization or requires some applet changes to get results.

Thus, the present disclosure helps to analyze field issues. There are times when a card gets unexpected behaviors such as declines or unexpected offline/online approvals or unexpected errors in the field. The present disclosure can provide tracing the communication interaction and may provide insight as where a problem lies, e.g., whether the contactless card or the reader configuration has issues depending on the command(s) exchanged. In some non-limiting embodiments or aspects, the system provided in the present disclosure may evolve. The present disclosure may help developers, testers, and product owners to ensure that a target feature is implemented as expected.

While various aspects and embodiments have been disclosed herein, other aspects and embodiments may be apparent to those skilled in the art. The various aspects and embodiments disclosed herein are for purposes of illustration and are not intended to be limiting, with the true scope and spirit being indicated by the following claims.

What is claimed is:

1. A method of capturing contactless communication interactions for debugging and evaluating a contactless card transaction, the method comprising:

receiving, by a reader device of a debugging system, a Near Field Communication (NFC) signal from a contactless card in response to a user placing the contactless card near the reader device, wherein the NFC signal indicates data associated with the contactless card;

initiating, by a card emulation device of the debugging system, a contactless transaction between the card emulation device and a payment device upon receiving the NFC signal in response to the user placing the card emulation device near the payment device, wherein the card emulation device emulates functionalities of the contactless card, wherein the payment device comprises a point-of-sale (POS) terminal;

obtaining, by the card emulation device of the debugging system, Application Protocol Data Unit (APDU) commands from the payment device in response to the initiation of the contactless transaction;

transmitting, by the card emulation device of the debugging system, the APDU commands to the reader device of the debugging system in response to obtaining the APDU commands;

receiving, by the reader device of the debugging system, the APDU commands from the card emulation device of the debugging system;

providing, by the reader device of the debugging system, the APDU commands to the contactless card in response to receiving the APDU commands;

detecting and receiving, by the reader device of the debugging system, an APDU response from the contactless card;

transmitting, by the reader device of the debugging system, the APDU response of the contactless card to the card emulation device in response to detecting and receiving the APDU response of the contactless card;

receiving, by the card emulation device of the debugging system, the APDU response of the contactless card from the reader device; and transmitting, by the card emulation device of the debugging system, the APDU response of the contactless card to the payment device in response to receiving the APDU response of the contactless card, wherein the APDU command and the APDU response are stored in each of the reader device and the card emulation device for debugging and evaluating the contactless card transaction, wherein the reader device communicates with the contactless card and the card emulation device communicates with the payment device in real time.

2. The method of claim 1, wherein the contactless card comprises at least one of the following: a smart card, a smart NFC Subscriber Identification Module (SIM) reader, a digital wallet application, a smart wearable, a virtual card, an NFC tag, a sticker, or any combination thereof.

3. The method of claim 1, wherein the reader device comprises one of an NFC card reader device configured with a computing device and a mobile device with in-built NFC capabilities.

4. The method of claim 3, wherein when the reader device is the NFC card reader device configured with the computing device, and the computing device communicates with the card emulation device.

5. The method of claim 1, wherein the card emulation device comprises a mobile device with in-built NFC capabilities.

6. The method of claim 1, wherein the reader device and the card emulation device are communicatively connected with each other.

7. A system for capturing contactless communication interactions for debugging and evaluating a contactless card transaction, the system comprising:

a reader device for receiving a Near Field Communication (NFC) signal from a contactless card in response to a user placing the contactless card near the reader device, wherein the NFC signal indicates data associated with the contactless card; and a card emulation device for initiating a contactless transaction between the card emulation device and a payment device in response to the user placing the card emulation device near the payment device, wherein the payment device comprises a point-of-sale (POS) terminal, wherein the card emulation device emulates functionalities of the contactless card and obtains Application Protocol Data Unit (APDU) commands from the payment device in response to the initiation of the contactless transaction, and transmits the APDU commands to the reader device in response to obtaining the APDU commands, wherein, in response to receiving the APDU commands from the card emulation device, the reader device transmits the APDU commands to the contactless card, and in response, detects and receives an APDU response from the contactless card, and transmits the APDU response to the card emulation device in response to detecting and receiving the APDU response from the contactless card, wherein, in response to receiving the APDU response, the card emulation device transmits the APDU response of the contactless card to the payment device, wherein the APDU command and APDU response are stored in each of the reader device and the card emulation device for debugging and evaluating the contactless card transaction, and wherein the reader device communicates with the contactless card and the card emulation device communicates with the payment device in real time.

8. The system of claim 7, wherein the contactless card comprises at least one of the following: a smart card, a smart NFC Subscriber Identification Module (SIM) reader, a digital wallet application, a smart wearable, a virtual card, an NFC tag, a sticker, or any combination thereof.

9. The system of claim 7, wherein the reader device comprises one of an NFC card reader device configured with a computing device and a mobile device with in-built NFC capabilities.

10. The system of claim 9, wherein when the reader device is the NFC card reader device configured with the computing device, and the computing device communicates with the card emulation device.

11. The system of claim 7, wherein the card emulation device comprises a mobile device with in-built NFC capabilities.

12. The system of claim 7, wherein the reader device and the card emulation device are communicatively connected with each other.

* * * * *